Figure 1:
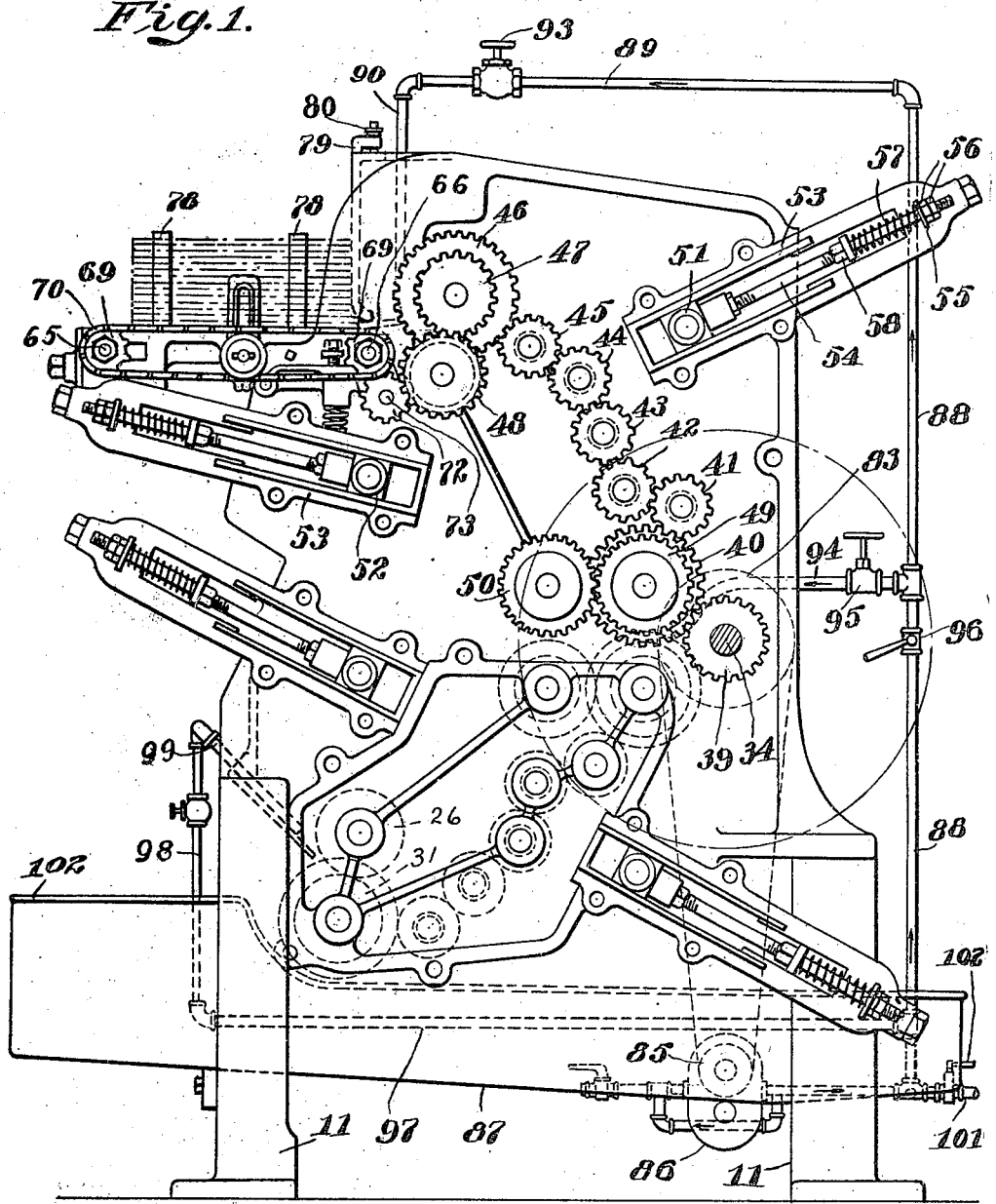

Jan. 29, 1924.    1,482,363
W. C. WRIGHT ET AL
LEATHER TEMPERING MACHINE
Original Filed July 30, 1919    4 Sheets-Sheet 3

Inventors
Wallace C. Wright
William J. Young
George B. Grover
by James R. Hodder
Attorney

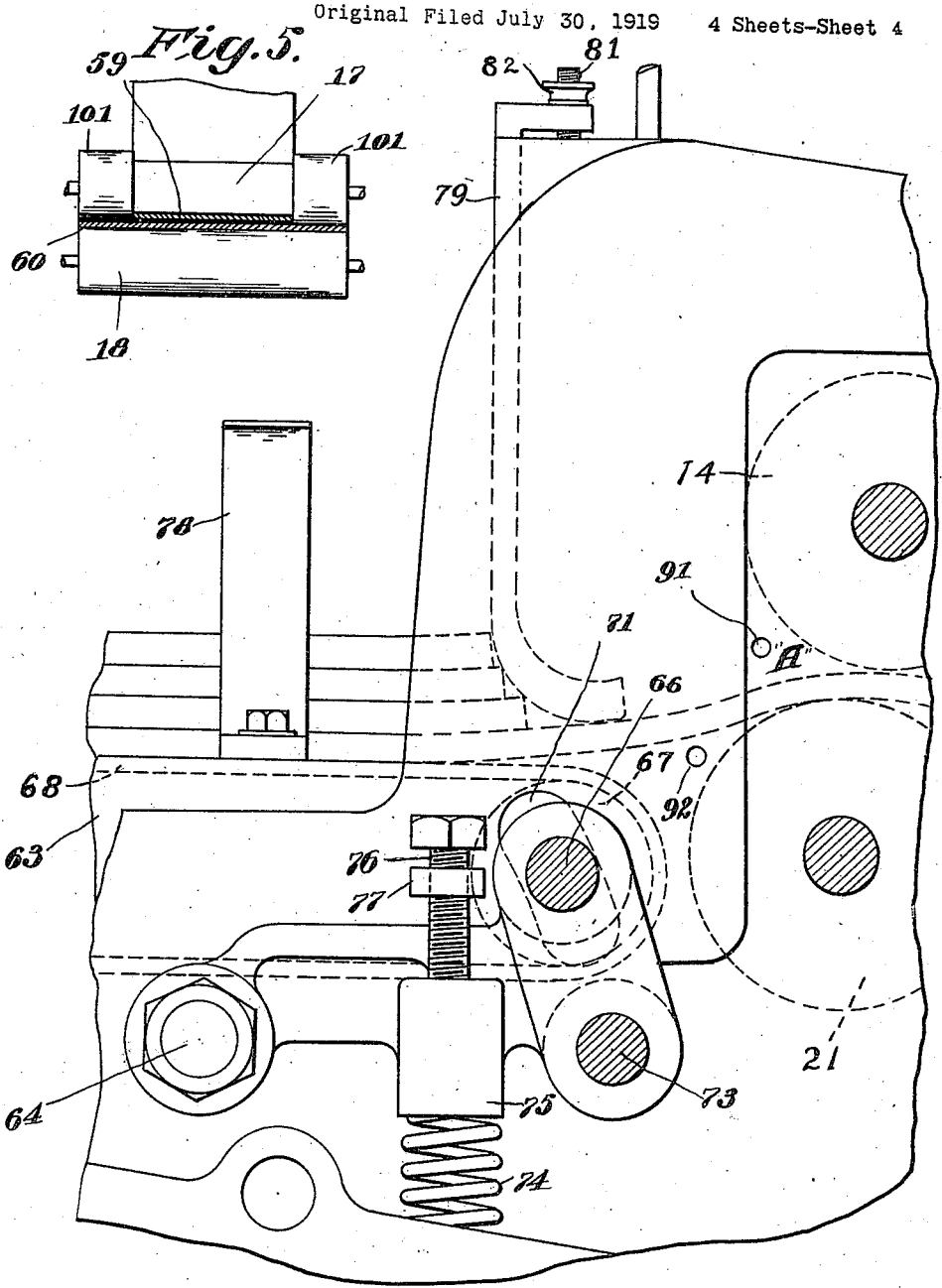

Patented Jan. 29, 1924.

1,482,363

UNITED STATES PATENT OFFICE.

WALLACE C. WRIGHT, OF BROOKFIELD, NEW HAMPSHIRE; WILLIAM J. YOUNG, OF PEABODY, AND GEORGE B. GROVER, OF LYNN, MASSACHUSETTS, ASSIGNORS, BY MESNE ASSIGNMENTS, TO AMERICAN SHOE MACHINERY COMPANY, OF BOSTON, MASSACHUSETTS, A CORPORATION OF MASSACHUSETTS.

LEATHER-TEMPERING MACHINE.

Application filed July 30, 1919, Serial No. 314,378. Renewed June 26, 1923.

*To all whom it may concern:*

Be it known that we, WALLACE C. WRIGHT, WILLIAM J. YOUNG, and GEORGE B. GROVER, citizens of the United States, residing in Brookfield, N. H., county of Carroll; Peabody, Mass., county of Essex; and Lynn, Mass., county of Essex, respectively, have invented an Improvement in Leather-Tempering Machines, of which the following description, in connection with the accompanying drawings, is a specification, like letters on the drawings representing like parts.

Our present invention relates to machines for rendering leather, shoe soles, and the like, flexible—and is an improvement on the type of machine shown in U. S. Patent No. 1,175,680 to Basler, and in our prior application, Ser. No. 229731, filed April 20, 1918, relating particularly to improvements in the feeding mechanism for such machines and in the form and arrangement of the flexing belts.

In machines of this type, it is important that the machine be utilized to the limit of its capacity and also that the conveying and flexing belts be under considerable tension and also that the machine be compact, economical and capable of supplying a suitable tempering fluid, and strong in construction Important objects of the invention are to carry out these features.

In carrying out this object we provide a table adjacent the throat of the machine, and mount thereon a magazine in which may be placed a plurality or vertical pile of the soles it is desired to temper. On the table and beneath the magazine we place an endless conveyor belt which is driven by suitable gearing at preferably the same surface speed as the flexing belts, though the surface speed of the flexing belts may bear any relation to the surface speed of the flexing belts that is desired. The conveyor belt is preferably made of a length of carding belt, and engages with the lowest sole in the pile of soles in the magazine, forcing the same under a guide plate and between the tempering fluid spray into the throat of the machine. The magazine may be of any desired capacity, and as the feed is automatic, the operator can devote the time during which the magazine is being emptied to preparing a pile of soles for insertion in the magazine. The result of this arrangement is that the machine may be worked continuously at full capacity by a single operator.

In machines of this character, the flexing belts are arranged in pairs and pass over rolls positioned to ensure the proper flexing of the soles. The rolls for each belt are so arranged that the faces of the belts are in engagement, and the continual rubbing of one belt on the other causes a rapid wearing out of the belts. The impossibility of stretching the belts unevenly to compensate for the difference in surface speed of two belts in engagement with each other and running on the same roll, though driven at the same speed, renders such wear unavoidable Further, belts for this purpose are expensive, and it has been found that belts of rubber, canvas, etc., while not injured as much by rubbing as belts of leather, are quickly damaged by the tempering fluid and do not flex the soles as satisfactorily as leather. Leather, on the other hand, is an ideal flexing means, and is not injured by the tempering fluid, and a means therefore, for preventing the wear incident to rubbing is desirable from both an operating and an economical standpoint.

Another object of our invention therefore, is the provision of means for running a pair of flexing belts in operative relation to, but out of engagement with, each other, over a plurality of rolls.

We have found that the greater part of the tempering operation is performed by one of the pair of belts, in conjunction with the rolls, the other belt acting principally as a feed belt. As the cost of a belt increases rapidly per running foot as the width increases, it seemed desirable to use as narrow belts as possible, both for the tempering belt and the feeding belt. The tempering belt however, should be substantially wider than the sole to be tempered, though the width of the feed belt may be reduced to about one-half that of the tempering belt and yet successfully function.

A further object of our invention therefore, and one relating to the last named object, is the provision of means for allowing the employment of a pair of flexing belts of different widths.

Other objects and novel features of construction and arrangement of parts will appear as the description of the invention progresses, and will be particularly pointed out in the claims.

Figure 2:
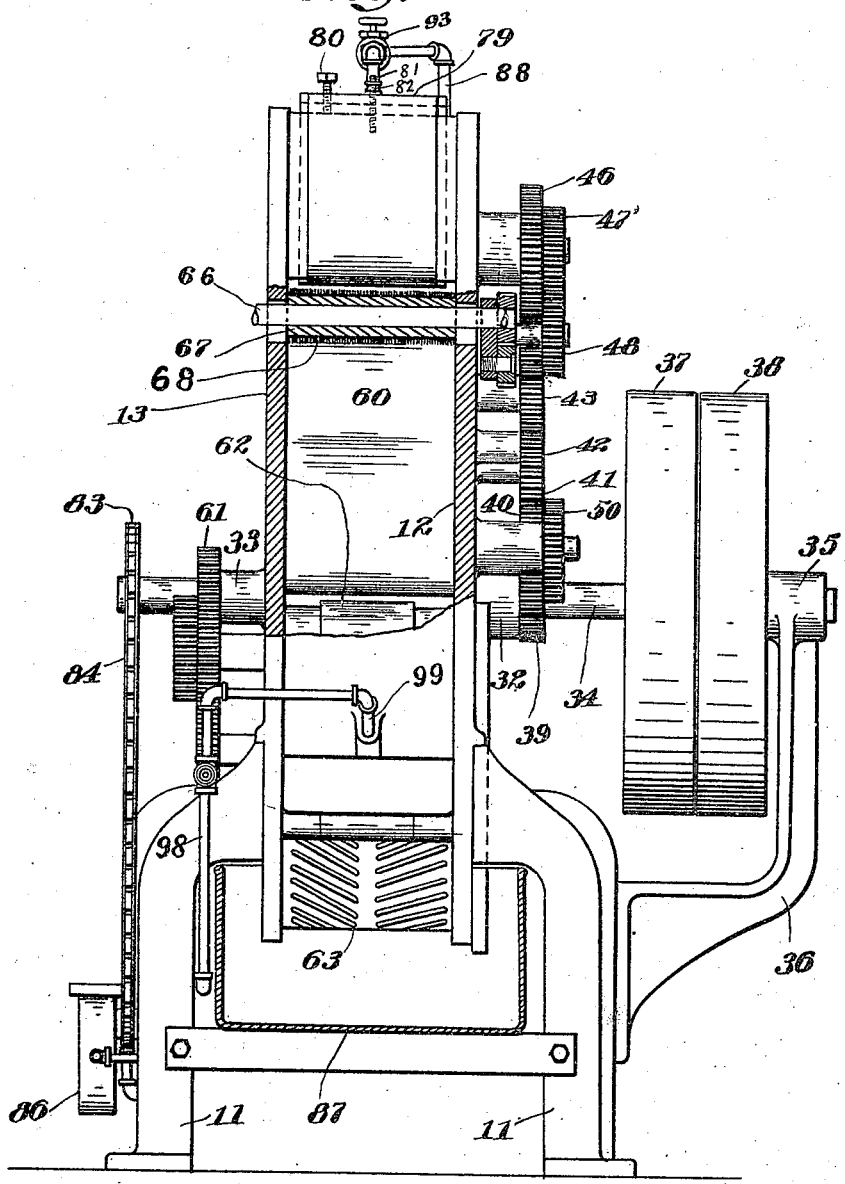
Figure 3:
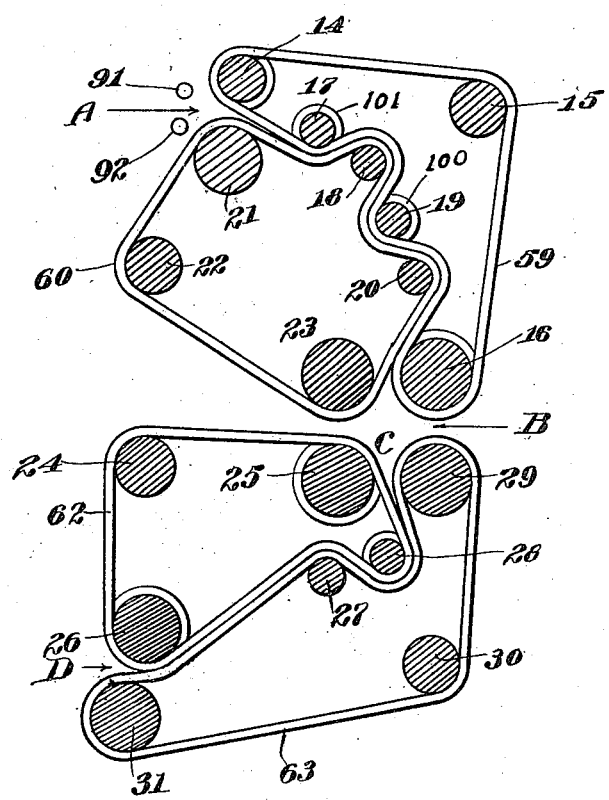
Figure 4:
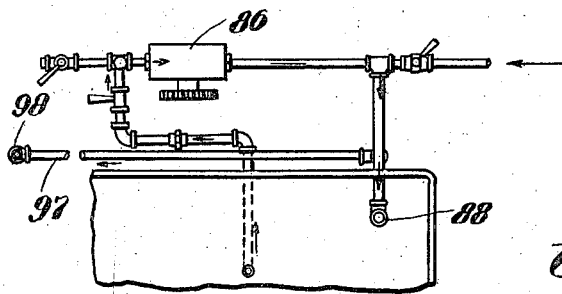

In the accompanying drawings, illustrating the preferred embodiment of our invention, Fig. 1 is a side elevation, Fig. 2 is a front elevation, partly in section, Fig. 3 is a diagrammatic view of a plurality of pairs of belts, and the rolls around which they are led, Fig. 4 is a detail showing the layout of the piping system for the tempering fluid, Fig. 5 is a detail of the means for maintaining the belts in operative relation to, but out of contact with, each other, and Fig. 6 is an enlarged detail of the magazine and carrier, showing the method of mounting the same on the machine for automatic adjustment.

Referring to the drawings, 10 designates a body or frame mounted at any convenient height on the legs 11. The body or frame is hollow and the side members 12 and 13 thereof are provided with a plurality of bearings for the shafts carrying the rollers 14—31 inclusive, some of these rollers being driving rollers and others idling rollers, as will be hereinafter more fully described.

Extending outwardly from the side members 12 and 13 are the bearings 32 and 33 respectively, in which is rotatably mounted the main drive shaft 34, and outboard bearing 35 on the top of the bearing strut 36, fastened to one of the legs 11, supporting the extreme outer end of said shaft. On the shaft 34, between the bearings 32 and 35, are the tight and loose pulleys 37 and 38 respectively, for connecting the drive shaft to any suitable source of power.

On the shaft 34, adjacent the bearing 32, is a gear 39, which meshes with a gear 40 on the shaft carrying the roller 16. The gear 40 in turn meshes with a gear 41 of the train of gears 41—45, inclusive, the gear 41 being an idler gear, while the gears 42, 43, 44 and 45 are mounted on the ends of the shafts carrying the breaker or flexing rolls 20, 19, 18, and 17 respectively. Gear 45 meshes in turn with a gear 46 on the end of the shaft carrying the roll 14. A second gear 47 on the shaft carrying the roll 14 meshes with a gear 48 on the shaft carrying the roll 21. Also, a second gear 49, on the shaft carrying the roll 16, meshes with a gear 50 on the shaft carrying the roll 23. By the above arrangement all the rolls noted are positively driven at equal surface speeds, with the exception of rolls 15 and 22, the shafts of which are mounted in tension bearings 51 and 52, respectively. These tension bearings are mounted for sliding movement in guideways 53. Attached to each bearing is a threaded bolt 54, the outer or free end of which passes through the lug 55, integral with the guideway 53. Check-nuts 56 limit the inward movement of the bearings and attached bolts, while a spring 57, the tension of which may be regulated by the nut 58, yieldingly holds the bearings in their inward position. Referring to Fig. 3, it will be noted that what may be termed the feeding belt 59 passes over the positively driven rolls 14 and 16, over the idling or tension roll 15 and in direct contact over the breaker or flexing rolls 17 and 19, while the breaker or tempering belt 60 passes over the positively driven rolls 21 and 23, over the idling or tension roll 22, and in direct contact over the breaker or flexing rolls 18 and 20. The arrangement of belts and rolls is such that, as clearly shown in Fig. 3, a throat A is formed where the belts pass inward over the rolls 14 and 21, while the two belts are in practical engagement with each other as they pass over the rolls 17, 19 and 18, 20, and form a discharge outlet B as they pass outward over the rolls 16 and 23.

Near the end of the shaft 34, adjacent the bearing 33, is a gear 61, which drives, through an appropriate train of gears, the rolls 24—31 inclusive, shown diagrammatically in Fig. 3. Feed belt 62 passes over the drive rolls 25 and 26, over the tension roll 24, and in direct contact over the breaker roll 28, while the breaker or tempering belt 63 passes over the drive rolls 29 and 31, over the tension roll 30, and in direct contact over the breaker roll 27. The rolls and belts just described are so located that the throat C is formed by the two belts as they pass inward over the rolls 25 and 29, and the discharge outlet as they pass outward over the rolls 26 and 31. But two breaker rolls, 27 and 28, are shown in Fig. 3, in the arrangement just described, and we have found these sufficient for the work as ordinarily performed. The number of rolls may however, be increased to any desired extent without departing from the spirit of the invention. Tensioning devices for the rolls 24 and 30 are provided, but as such devices are identical with those provided for the rolls 15 and 22, they need not be described in detail.

On the front of the machine, adjacent the throat A, is an automatic magazine feeder, comprising a frame 63 pivotally mounted on the shaft 64 extending between the side members 12 and 13. Parallel shafts 65 and 66, mounted at each end of the frame 63 carry rollers, but one of which, 67, is shown, and on these rollers is mounted an endless feed belt 68. Sprockets 69 are provided on the parallel shafts 65 and 66 and power is transmitted from one shaft to the other by the chain 70. Slots 71 in the side members 12 and 13, and through which the ends of the shaft 66 pass, allow limited movement of the frame 63 about the shaft 64. The shaft 66 tends to move to the top of the slots 71 under the influence of the spring 74 located between one of the guideways 53 and a boss 75 on the frame 63. The upward movement of the shaft 66 is however, limited by the adjusting bolt 76, screwed through a lug 77 on the frame 63. A gear on one end of the shaft 66 meshes with a gear 72 on a shaft 73 in the frame 63, and this gear in turn meshes with and receives power from the gear 48, above described. The arrangement is such that the gear 72 is always in mesh with the gear 48 regardless of the position of the shaft 66 in the slots 71.

We have found that a belt manufactured from the ordinary carding belt makes an efficient feeding means, and we have illustrated it as being so made. Any other feeding belt, of suitable material, may be used however, if desired.

On the frame 63, and at either side thereof, are the magazine frames 78, one two, or more, depending on the length of the soles to be stacked in the magazine. A pile-up of soles is shown in position in the magazine in Figs. 1 and 6, with the ends of the soles abutting against an adjustable apron or stop 79. This apron or stop is mounted for vertical movement in the frame of the machine above the conveyor belt 68. The upper end of the apron is bent at right angles and has an adjusting bolt 80 threaded therethrough and abutting against the top of the frame to adjust the apron vertically. A stud 81, threaded into the top of the frame, passes through a hole in the right-angled portion of the apron, and the thumbnut 82 thereon limits the upward movement of said apron. The lower end of the apron is rounded, as clearly shown in Figs. 1 and 6, to define in connection with the conveyor belt, a guiding passage in front of the throat A. The spring 74, tending to move the end of the conveyor belt into engagement with the rounded portion of the apron, ensures that the soles will be properly guided into the throat A. Further, the forcing of the soles against the apron prevents the feeding of but one sole at a time into the throat.

On the end of the drive shaft 34, adjacent the gear 61, is a sprocket 83, over which runs a sprocket chain 84; this sprocket chain also running over the sprocket 85 on the shaft of a pump 86, located on the legs 11 beneath the frame, in any convenient manner. Beneath the frame and on the legs 11 is located a tank 87, which contains the tempering fluid. By a suitable system of piping, the exact details of which are unnecessary for a proper understanding of the present invention, the tempering fluid is delivered at desired points for use on the soles, and the surplus runs back into the tank, to be used over and over again. Essentially, the pump 86, operated by power transmitted by the chain 84 from the main drive shaft 34, pumps the tempering fluid to a riser 88. From this riser, the fluid is led through pipes 89 and 90 into a pair of parallelly disposed spray pipes 91 and 92, located in front of and above and below the throat A. These pipes 91 and 92 are each provided with a plurality of aligned holes which direct the tempering fluid onto each side of the sole passing through the machine. A valve 93 provides means for regulating the flow of fluid through the spray pipes 91 and 92. From the riser 88 the pipe 94 is led to a suitable spraying means (not shown), this spraying means directing a stream or spray of tempering fluid onto the soles as they pass from the exit passage B into the entering throat C of the second pair of tempering belts. A valve 95 is located in the pipe 94 to regulate the flow of liquid through the pipe. A shut-off valve 96 in the riser 88 and below the pipe 94 is provided for shutting off the flow of liquid to the pipes 89 and 94. We may also, if desired, extend pipes 97 and 98 from the riser 88 and lead the fluid therethrough to a spray pipe 99, which directs the fluid onto the soles as they issue from the exit D. Any excess of fluid sprayed on the soles falls back into the tank 87, so that there is no waste of the fluid.

We have arranged the pairs of belts, for example, the belts 59 and 60, so that one of the belts, as 59, is approximately one-half the width of the other, 60. In order that there shall be the minimum wear of the tempering belts, we provide, for example, at the ends of the breaker rolls 17 and 19, with which the narrow belt 59 is in direct engagement, auxiliary rolls as shown in Figs. 3 and 5, 101, which bear on the belt 60 and are slightly greater in diameter than the roll 17 plus twice the thickness of the belt 59 to ensure a clearance between the belts 59 and 60, while yet maintaining said belts in operative relation to each other. Auxiliary rolls are also placed at the ends of the rolls 14 and 16 to guide the belt 59 in proper position with relation to the belt 60. The belt 62, of the pair of belts 62, 63 is arranged similarly to the belt 59, auxiliary guiding rolls being placed on the idler rolls 25 and 26, and auxiliary rolls, similar to the auxiliary rolls 100 and 101, on the breaker roll 28.

To operate, the machine is started and the flow of tempering fluid, at the various spray points, regulated by the valves 93 and 95. The apron 79 is adjusted to regulate the size of the feed opening, and a pile-up of soles placed in the magazine 78, from which they are fed, one by one, by the conveyor belt 68, past the spray pipes 91 and 92 into the throat A. At this point they are grasped by the belts 59 and 60 and, as the belts pass over the rolls 17, 18, 19 and 20, the soles are flexed first in one direction and then in the other, a plurality of times, finally passing from the exit B and into the receiving throat C, where tempering fluid from the pipe 94 is sprayed onto the soles. The soles, after passing over the rolls 27 and 28 are ejected from the passage D onto a receiving table 102 at the front end of the trough 87. During the time the magazine is being emptied, the operator may be devoting himself to arranging a pile-up of soles for insertion in the magazine, and as he may devote his whole time to this duty, he can keep the machine continuously working at capacity.

As the pairs of belts are held in operative relation to, but out of engagement with, each other, at the rolls 17 and 19, the wear of the belts is reduced to the minimum. Further, this arrangement enables us to use a feeding belt considerably less in width than the flexing belt, thereby effecting a substantial saving in the former outlay for belts. The machine is shown and described as operating upon soles but it will be appreciated that it is of equal value and importance for handling any similar leather blanks, or in treating and operating upon stock for belts, harness, or the like.

Having thus described our invention, what we claim and desire to secure by Letters Patent, is:—

1. A sole flexing machine having, in combination, two endless belts between which the soles are supported, breaker rolls over which the belts pass to flex the soles, and means for holding the belts in operative relation to, but out of engagement with, each other at predetermined parallel portions.

2. A sole flexing machine having, in combination, two endless belts between which the soles are supported, breaker rolls over which the belts pass to flex the soles, and means for holding the belts in operative relation to, but out of contact with, each other at a plurality of predetermined parallel portions.

3. A sole flexing machine having, in combination, two endless belts between which the soles are supported one belt being wider than the other, a roll over which one of said belts runs, an auxiliary roll associated with said roll and over which the other of said belts runs, the diameter of said auxiliary roll being slightly greater than the diameter of said other roll plus twice the thickness of said belt, whereby the belts as they pass over the rolls are held out of engagement with, but in operative relation, to each other.

4. A sole flexing machine having, in combination, two endless belts between which the soles are supported one belt being wider than the other, a roll over which one of said belts runs, a pair of auxiliary rolls associated with said roll and over which the other of said belts runs, the diameter of said auxiliary rolls being slightly greater than the diameter of said other roll plus twice the thickness of said belt, whereby the belts as they pass over the rolls are held out of engagement with, but in operative relation to, each other.

5. A sole flexing machine having, in combination, two endless belts between which the soles are supported, one of said belts being wider than the other, a roll, over which the narrowest of said belts runs, a pair of auxiliary rolls mounted concentric with and at each end of said roll and over which the second of said belts runs, the diameter of said auxiliary rolls being slightly greater than the diameter of said other roll plus twice the thickness of the belts, whereby the belts as they pass over the rolls are held out of engagement with, but in operative relation to, each other.

6. A sole flexing machine having, in combination, two endless belts defining a tortuous path along which the sole is carried in the tempering process, a receiving throat at the beginning of said tortuous path, a table, a magazine mounted thereon and including an endless conveyor belt for feeding the soles from the magazine, means for driving said endless conveyor belt and said two endless belts at substantially equal surface speeds, and tempering fluid spraying means located between the endless conveyor belt and said receiving throat.

7. A sole flexing machine having, in combination, two endless belts defining a tortuous path along which the sole is carried in the tempering process, a receiving throat at the beginning of said tortuous path, a pivotally mounted table, a magazine mounted thereon and including an endless conveyor belt for feeding the soles from the magazine, means tending to move the end of the endless conveyor belt, adjacent the receiving throat, upwardly, an adjustable apron co-operating with the endless conveyor belt and the magazine for guiding the soles from the magazine upwardly and rearwardly into the receiving throat.

8. A sole flexing machine having, in combination, a plurality of pairs of endless belts defining a plurality of tortuous paths along which the sole is carried by the pairs of belts in the tempering process, a receiving throat at the beginning of each tortuous path, an outlet defined by the first pair of endless belts in operative relation to the receiving throat at the beginning of a second pair of belts, means for driving said belts at substantially equal surface speeds, and means for spraying tempering fluid onto the soles as they pass into the receiving throats.

In testimony whereof, we have signed our names to this specification, in the presence of two subscribing witnesses.

WALLACE C. WRIGHT.
  WILLIAM J. YOUNG.
  GEORGE B. GROVER.

Witnesses:
 H. ASHLEY BOWEN,
 AUGUSTA PRUSS.